US007124074B2

(12) United States Patent
Weise et al.

(10) Patent No.: US 7,124,074 B2
(45) Date of Patent: Oct. 17, 2006

(54) METHOD AND APPARATUS FOR PROVIDING IMPROVED HMM POS TAGGER FOR MULTI-WORD ENTRIES AND FACTOIDS

(75) Inventors: David Neal Weise, Kirkland, WA (US); Aravind Bala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/151,953

(22) Filed: Jun. 14, 2005

(65) Prior Publication Data

US 2005/0234717 A1   Oct. 20, 2005

Related U.S. Application Data

(63) Continuation of application No. 09/907,315, filed on Jul. 17, 2001, now Pat. No. 6,985,851.

(51) Int. Cl.
  *G06F 17/27*   (2006.01)
  *G06F 17/21*   (2006.01)
  *G06F 17/28*   (2006.01)
(52) U.S. Cl. .................. 704/9; 704/4; 704/10
(58) Field of Classification Search .................. 704/9, 704/8, 1, 10, 4
  See application file for complete search history.

(56) References Cited

U.S. PATENT DOCUMENTS

| 4,641,264 | A  | * | 2/1987  | Nitta et al. ..................... 704/4 |
| 5,642,519 | A  |   | 6/1997  | Martin ............................ 704/9 |
| 6,278,967 | B1 |   | 8/2001  | Akers et al. ..................... 704/2 |
| 6,490,549 | B1 | * | 12/2002 | Ulicny et al. .................. 704/10 |
| 6,615,172 | B1 | * | 9/2003  | Bennett et al. .............. 704/257 |
| 6,760,695 | B1 |   | 7/2004  | Kuno et al. ..................... 704/9 |
| 2001/0056352 | A1 | * | 12/2001 | Xun ........................... 704/277 |

OTHER PUBLICATIONS

Thede et al. A Second-Order Hidden Markov Model for Part-of-Speech Tagging, 1999, Proceedings of the 37th conference on Association for Computational Linguistics, 175-182.*

Thede et al., A Second-Order Hidden Markov Model for Part-of Speech Tagging, 1999, Proceedings of the 37th Conference on Association for Computational Linguistics, pp. 1475-182.

T. Tsuboi et al., "A speech-to-Text Transcription System for Medical Diagnoses", 1994 International Conference on Spoken Language Proceedings, vol. 2, pp. 687-690 1994.

H. Singer et al., "Non-Uniform Unit Parsing for SSS-LR Continuous Speech Recognition", IEEE International Conference on Acoustics, Speech and Signal Processing, Apr. 19-22, 1994.

(Continued)

*Primary Examiner*—Richemond Dorvil
*Assistant Examiner*—Thomas E. Shortledge
(74) *Attorney, Agent, or Firm*—John D. Veldhuis-Kroeze; Westman, Champlin & Kelly, P.A.

(57) ABSTRACT

A method of calculating trigram path probabilities for an input string of text containing a multi-word-entry (MWE) or a factoid includes tokenizing the input string to create a plurality of parse leaf units (PLUs). A PosColumn is constructed for each word, MWE, factoid and character in the input string of text which has a unique first (Ft) and last (Lt) token pair. TrigramColumns are constructed which define corresponding TrigramNodes each representing a trigram for three PosColumns. Forward and backward trigram path probabilities are calculated for each separate TrigramNode. The sums of all trigram path probabilities through each PLU are then calculated as a function of the forward and backward trigram path probabilities. Systems and computer-readable medium configured to implement the methods are also provided.

20 Claims, 14 Drawing Sheets

OTHER PUBLICATIONS

C.D. Manning et al., "Foundations of Statistical Natural Language Processing", MIT Press, 1999, Chapters 9 and 10.

Jian-Ping Zhang et al., "A Study of Error-Tolerant Techniques for Speech Understanding", Acta Electronica Sinica, vol. 28, No. 3, pp. 56, 84-86, Mar. 2000.

L.R. Rabiner and B.H. Juang, "An Introduction to Hidden Markov Models," IEE ASSP Magazine, Jan. 1986.

R.M. Stern et al., "Sentence Parsing with Weak Grammatical Constraints", 1987 International Conference on Acoustics, Speech and Signal Processing (Cat. No. 87CH2396-0) pp. 380-383, vol. 1, Apr. 6-9, 1987.

W.H. Ward et al., "Parsing Spoken Phrases Despite Missing Words", 1988 International Conference on Acoustics, Speech and Signal Processing (IEEE Cat. No. 88CH2561-9) pp. 275-278, vol. 1, Apr. 11-14, 1988.

D. O'Shaughnessy, "Using Syntactic Information to Improve Large-Vocabulary Word Recognition", 1989 International Conference on Acoustics, Speech and Signal Processing (IEEE Cat. No. 89CH2673-2) pp. 715-718, May 23-26, 1989.

T. Vosse, Detecting and Correcting Morpho-Syntactic Errors in Real Texts:, Proceedings of 3rd Conference on Applied Natural Language Processing, Mar. 31-Apr. 3, 1992.

E. Charniak, "Statistical Language Learning", MIT 1993, Chapters 3 and 4.

* cited by examiner

INPUT STRING: ⟶ "He sort of likes her."

TOKENS ⟶ He　sort　of　likes　her　.

TOKEN NUMBER ⟶ 1　2　3　4　5　6

Ft, Lt ⟶ (1,1) (2,2) (3,3) (4,4) (5,5) (6,6)

MWE'S IDENTIFIED ⟶ He　sort　of　sort of　likes　her　.

Ft, Lt ⟶ (1,1) (2,2) (3,3) (2,3) (4,4) (5,5) (6,6)

MWE'S IDENTIFIED ⟶ He　sort　of　sort of　likes　her　.

Ft, Lt ⟶ (1,1) (2,2) (3,3) (2,3) (4,4) (5,5) (6,6)

POS ⟶ Noun　Noun　Prep　Adv　Noun　Pron　Char
　　　　Pron　Verb　　　Adj　Verb　Adj

He　sort　of　sort of　likes　her　.

(1,1) (2,2) (3,3) (2,3) (4,4) (5,5) (6,6)

Pos Column Example

Pos Column Array

| Trigram Columns Derived From PosColumnArray ||
|---|---|
| Trigram Column Number | PosColumn Set |
| TC1 | (PC0, PC1, PC2) |
| TC2 | (PC1, PC2, PC3) |
| TC3 | (PC1, PC2, PC4) |
| TC4 | (PC2, PC3, PC5) |
| TC5 | (PC2, PC4, PC6) |
| TC6 | (PC3, PC5, PC6) |
| TC7 | (PC4, PC6, PC7) |
| TC8 | (PC5, PC6, PC7) |
| TC9 | (PC6, PC7, PC8) |
| TC10 | (PC7, PC8, PC9) |
| TC11 | (PC8, PC9, PC10) |

FIG. 7

| Left Neighbor(s) | TrigramColumn Number | Right Neighbor(s) |
|---|---|---|
| ---- | TC1 | TC2 and TC3 |
| TC1 | TC2 | TC4 |
| TC1 | TC3 | TC5 |
| TC2 | TC4 | TC6 |
| TC3 | TC5 | TC7 |
| TC4 | TC6 | TC8 |
| TC5 | TC7 | TC9 |
| TC6 | TC8 | TC9 |
| TC7 and TC8 | TC9 | TC10 |
| TC9 | TC10 | TC11 |
| TC10 | TC11 | ----- |

FIG. 9

Elements of a Trigram Node (POS1, POS2, POS3, FP, Prob, BP, Path Prob)

FP   = Forward Probability (Tr.leftProb)
    Prob = P(POS3/POS1, POS2)
    BP   = Backward Probability (Tr.rightProb)
    Path Prob = Sum of probabilities of all
                Paths through the node

FIG. 8a

TrigramArray (TC1)

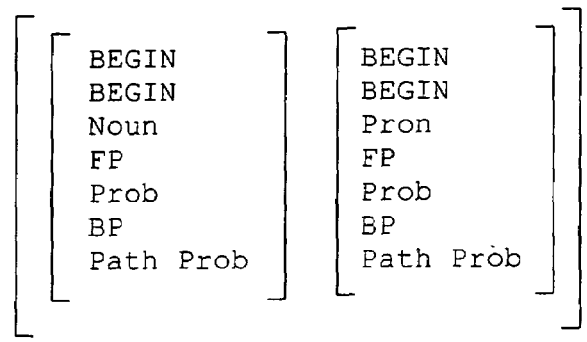

FIG. 8b

Trigram Graph (TC1,  Trigram Array (TC1))
    (TC2,  Trigram Array (TC2))
    (TC3,  Trigram Array (TC3))
    (TC4,  Trigram Array (TC4))
    (TC5,  Trigram Array (TC5))
    (TC6,  Trigram Array (TC6))
    (TC7,  Trigram Array (TC7))
    (TC8,  Trigram Array (TC8))
    (TC9,  Trigram Array (TC9))
    (TC10, Trigram Array (TC10))
    (TC11, Trigram Array (TC11))

FIG. 8c

NORMALIZATION OF PLU PosProbs

PC7

NORMALIZATION OF PLU MWE
AND FACTOID PosProbs

PC3 AND PC4

Process modification for choosing between a larger unit (MWE or factoid) andits constituents Non-normalized TrigramColumn TC4
(sort, of, likes), "sort of" is a multi-word entry.

(Noun, Noun, Prep, FP, 0.001, BP, PP)
(Noun, Verb, Prep, FP, 0.002, BP, PP)
(Pron, Noun, Prep, FP, 0.009, BP, PP)
(Pron, Verb, Prep, FP, 0.008, BP, PP)

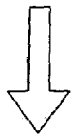

Normalized TrigramColumn TC4

(Noun, Noun, Prep, FP, 1, BP, PP)
(Pron, Noun, Prep, FP, 1, BP, PP)
(Noun, Verb, Prep, FP, 1, BP, PP)
(Pron, Verb, Prep, FP, 1, BP, PP)

FIG. 15

METHOD AND APPARATUS FOR PROVIDING IMPROVED HMM POS TAGGER FOR MULTI-WORD ENTRIES AND FACTOIDS

The present application is a continuation of and claims priority of U.S. patent application Ser. No. 09/907,315, filed Jul. 17, 2001 now U.S. Pat. No. 6,985,851, the content of which is hereby incoporated by reference in its entirety.

BACKGROUND OF THE INVENTION

The present invention relates to natural language processing. More particularly, the present invention relates to the field of parsing natural human language.

In processing natural languages, such as English, Hebrew and Japanese, a parser is typically used in the analysis of sentences. A parser determines, for a sentence, the roles the words play and the interdependencies between those words. A first stage in parsing is breaking the input sentence into words and looking those words up in a lexicon to determine what parts of speech (POS) any word can have. For example the word "brachiate" can only be a verb, the word "sentence" could be a verb or noun, and "still" could be a noun, verb, adverb, as well as other parts of speech. There are also individual words that, when adjacent in a sentence, act as a unit as a different part of speech. For example "kind of" is treated as an adverb in the sentence "I kind of like her." But in the sentence "It is a kind of cabbage," the word "kind" is a noun and the word "of" is a preposition. Similar sets are "sort of," "at least," and "on the other hand." These sets are called Multi-Word-Entries, or MWEs. A parsing system can assign many different types of parts of speech.

In addition, some parsers construct larger units from individual words before doing the syntactic parse. These larger units generally have internal structure that is not syntactic. For example, street addresses, time of day, and proper names all have internal structure that must be dealt with outside of syntax. In the sentence "David Parkinson visited 123 Elm Street at 11:30 AM," the emphasized units ("David Parkinson", "123 Elm Street" and "11:30 AM") can be treated as a larger unit by the grammar component (which is responsible for syntax). These units are called factoids. However, some sentences could have conflicting factoids. For example in the sentence "After 1 second St. Augustine appeared" there are two overlapping factoids: "1 second St." (which could be a street address), and "St. Augustine" (which could be a saint's name.) Other sentences could have items in them that might be incorrectly identified as a factoid if the entire context of the sentence is not considered. For example, in the Sentence "After I saw Henry Nixon walked into the room" we do not want "Henry Nixon" as a factoid.

The speed of a parser is dependent on how many different combinations of words it has to put together before it achieves a parse that spans the input sentence. There are many dead ends it could explore before finding the right way. For example, if it considers a part of speech for a word that does not make sense by building larger structures using it, then all that work is for naught. In a similar vein, if it considered a MWE as a first when it shouldn't have, or a factoid when the individual units are the correct one, then the parsing of that sentence will be slow. In addition, incorrect parses can be produced if the parser considers wrong parts of speech first. If an incorrect parse is generated before the correct one, and the parser decides to stop looking for the correct one, then an incorrect parse will be produced. The accuracy of factoid identification is also an issue. Confidence in whether a span is a factoid is done at two places in the system. When the factoid is constructed, and when the parse completes.

A Hidden Markov Model (HMM) using trigrams is a standard technique to predict which part of speech for each word is the preferred one in a given sentence. However, techniques for determining the parts of speech for MWE's and factoids are needed to improve parser performance. Also needed to improve parser performance are techniques to determine whether larger units, such as MWE's and factoids, should he considered first, or whether their individual pieces should be considered first by the parser.

SUMMARY OF THE INVENTION

A method of calculating trigram path probabilities for an input string of text containing a multi-word-entry (MWE) or a factoid includes tokenizing the input string to create a plurality of parse leaf units (PLUs). A PosColumn is constructed for each word, MWE, factoid and character in the input string of text which has a unique first (Ft) and last (Lt) token pair. TrigramColumns are constructed which define corresponding TrigramNodes each representing a trigram for three PosColumns. Forward and backward trigram path probabilities are calculated for each separate TrigramNode. The sums of all trigram path probabilities through each PLU are then calculated as a function of the forward and backward trigram path probabilities.

BRIEF DESCRIPTION OF THE DRAWINGS

FIG. 4b is a flow diagram illustrating sub-steps of the tokenizing step shown in FIG. 4a.

FIG. 7 is a table illustrating TrigramColumns and corresponding PosColumn sets in one example.

FIG. 8a illustrates the elements of a Trigram Node.

FIG. 8b illustrates an example of a TrigramArray.

FIG. 8c illustrates an example of a TrigramGraph.

FIG. 9 is a table illustrating left and right neighbors of each TrigramColumn in one example.

FIGS. 13–15 are diagrammatic illustrations of various alternative embodiments of the step of normalizing PosProb probabilities in each PosColumn.

DETAILED DESCRIPTION OF ILLUSTRATIVE EMBODIMENTS

Figure 1:
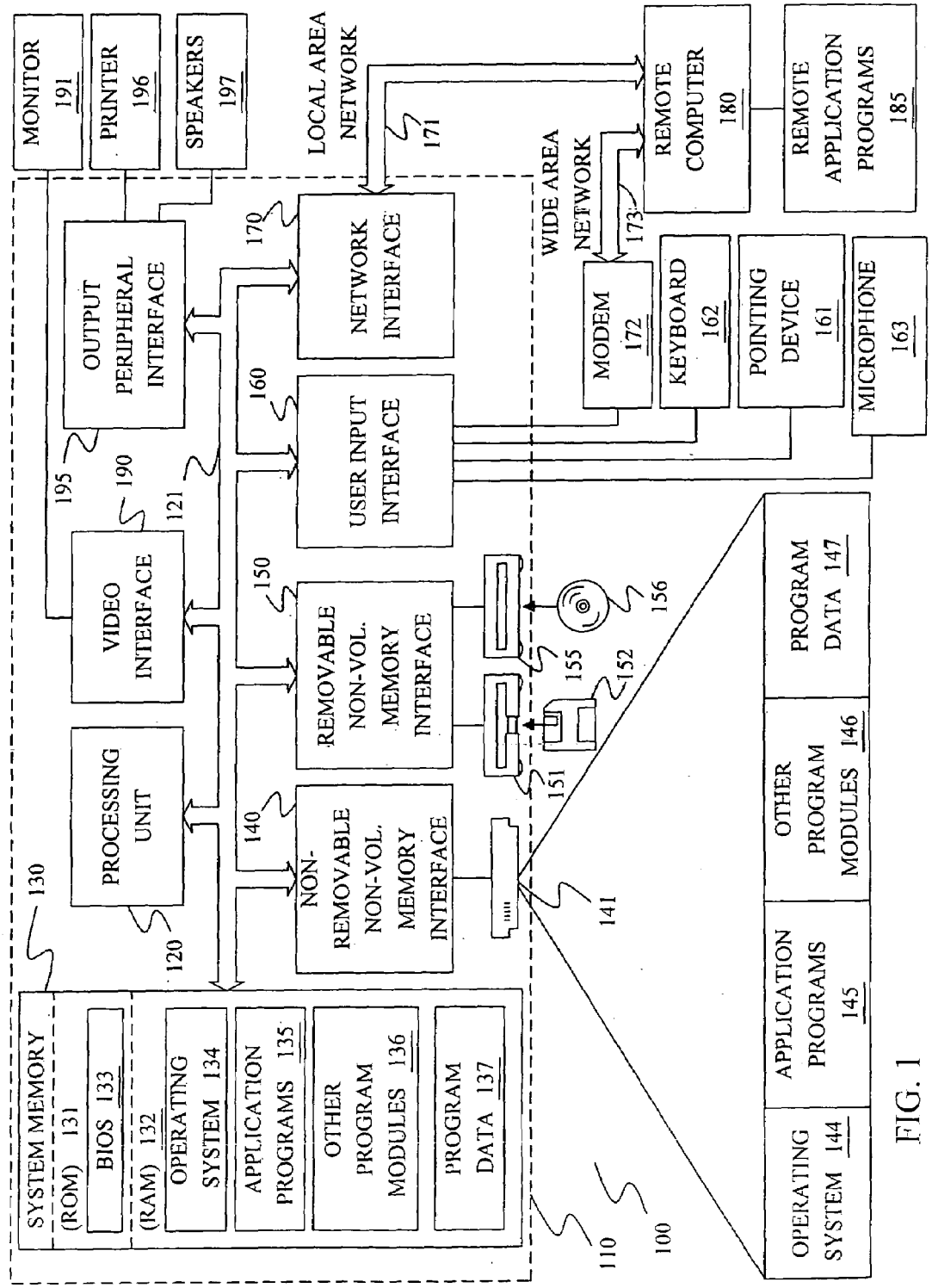
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 5 include a local area network (LAN) 171 and a wide area network (WAN) 173, but may also include other networks. Such networking environments are commonplace in offices, enterprise wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
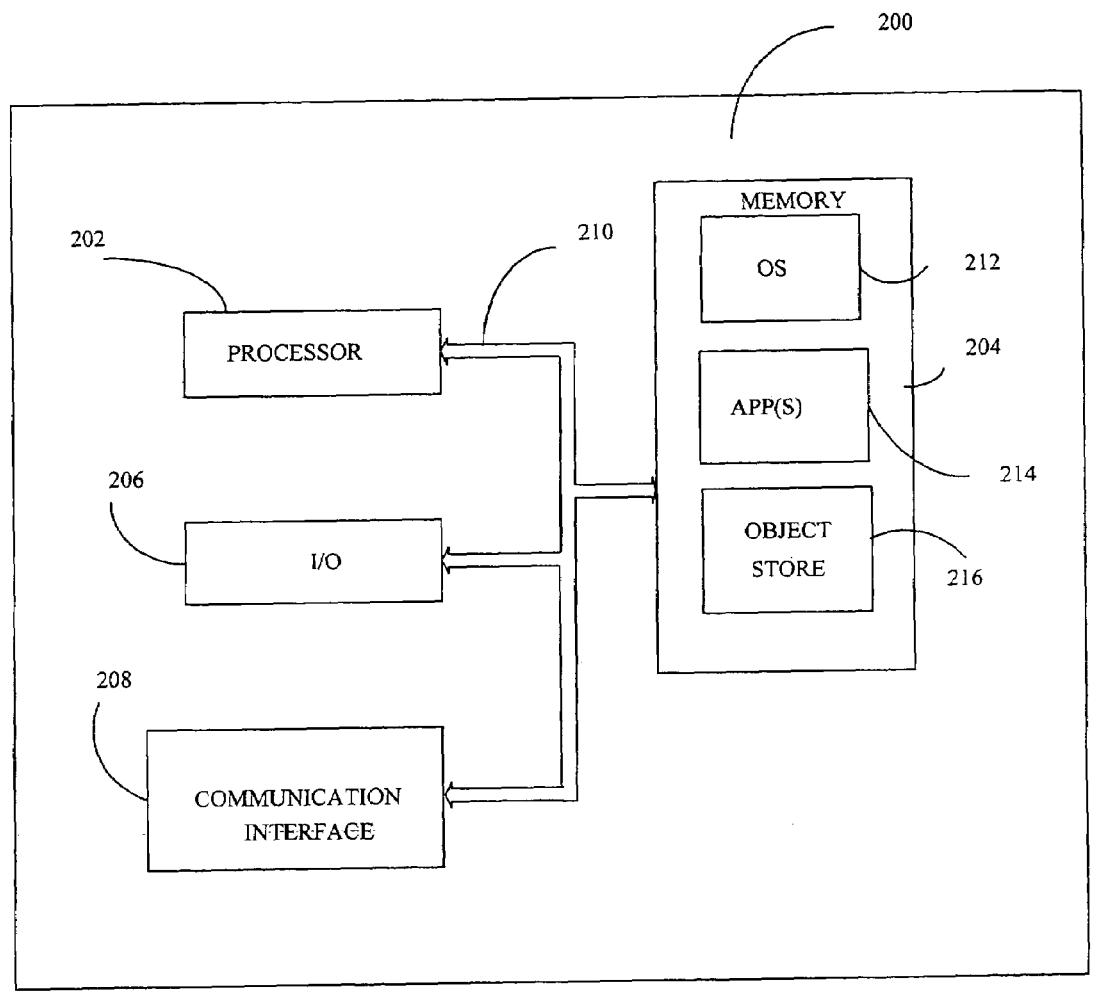
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, processor 202 from memory 204 preferably executes operating system 212. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
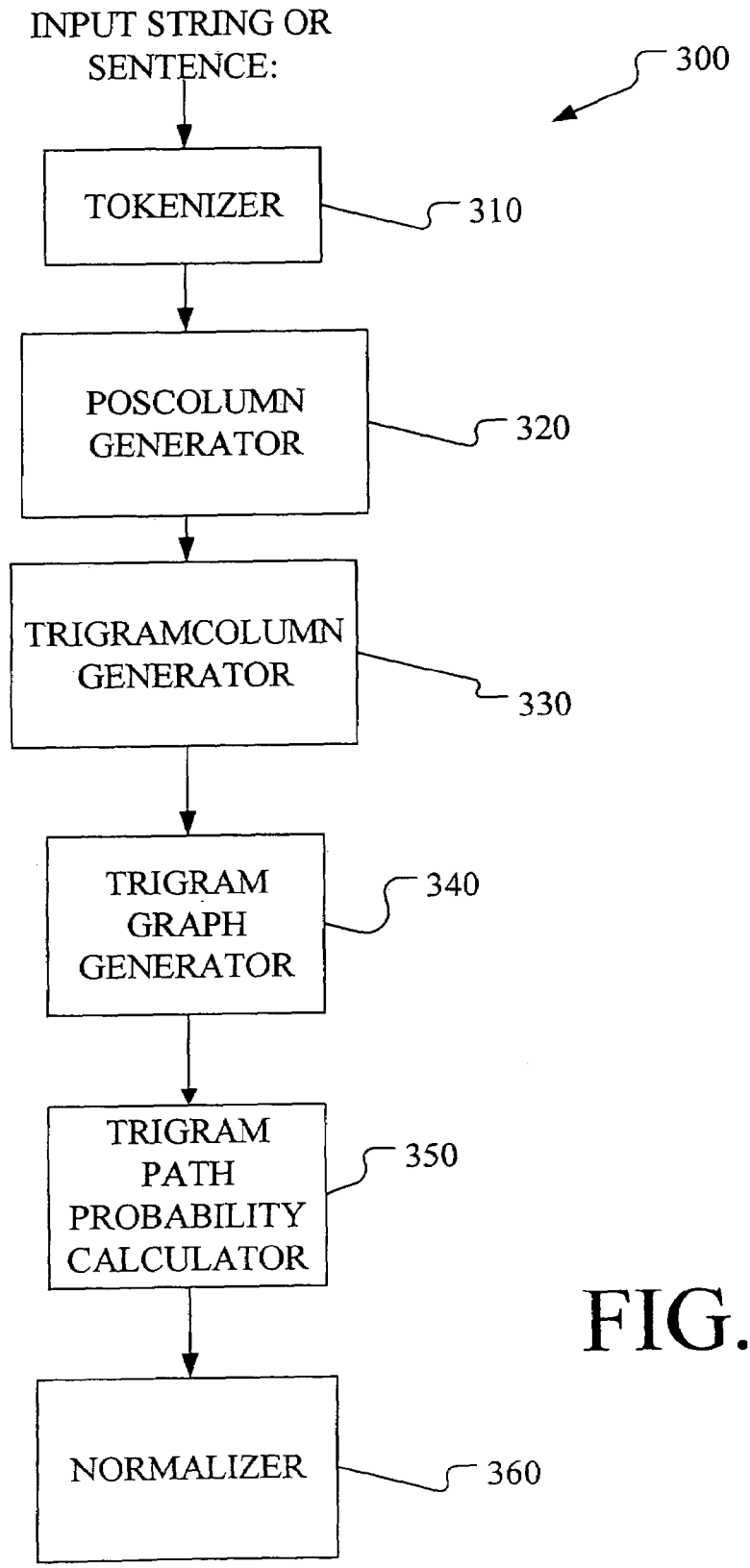
FIG. 3 is a diagram illustrating an HMM tagger system.

FIG. 3 is a system diagram which can be implemented in a computing environment such as computer 110 or mobile device 200. System 300 provides one example of a system which is configured to implement the steps of the methods disclosed herein. The illustrated components of system 300 should be considered to be examples, and it should be realized that the steps of the methods disclosed herein can be implemented in components other than those described with reference to FIG. 3.

System 300 can be considered to be a trigram path probability calculating system for calculating trigram path probabilities for an input string of text containing a multi-word-entry (MWE) or a factoid. System 300 includes a tokenizer 310, a PosColumn generator 320, a TrigramColumn generator 330, a Trigram Graph generator 340, a trigram path probability calculator 350 and a normalizer 360. Not all of the components illustrated in FIG. 3 are required, and the functions provided by one or more components can be further separated into more components or combined into fewer components. A more detailed discussion of the system shown in FIG. 3 is provided after the following discussion of methods of the present invention provided with reference to FIGS. 4–15.

Tokenize Input String of Text

Figure 4A:
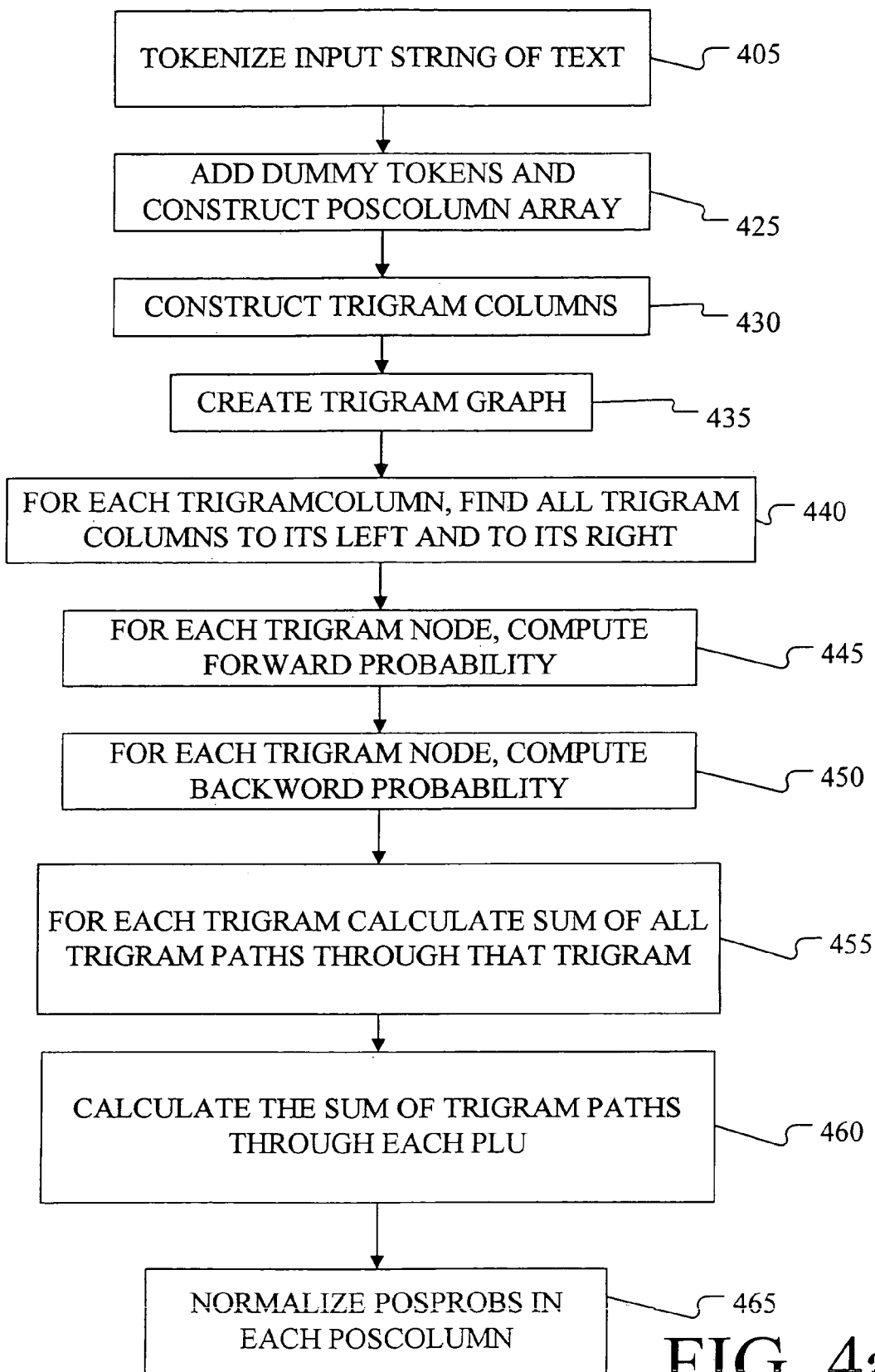
FIG. 4a is a flow diagram illustrating general methods of the invention.
Figure 4B:
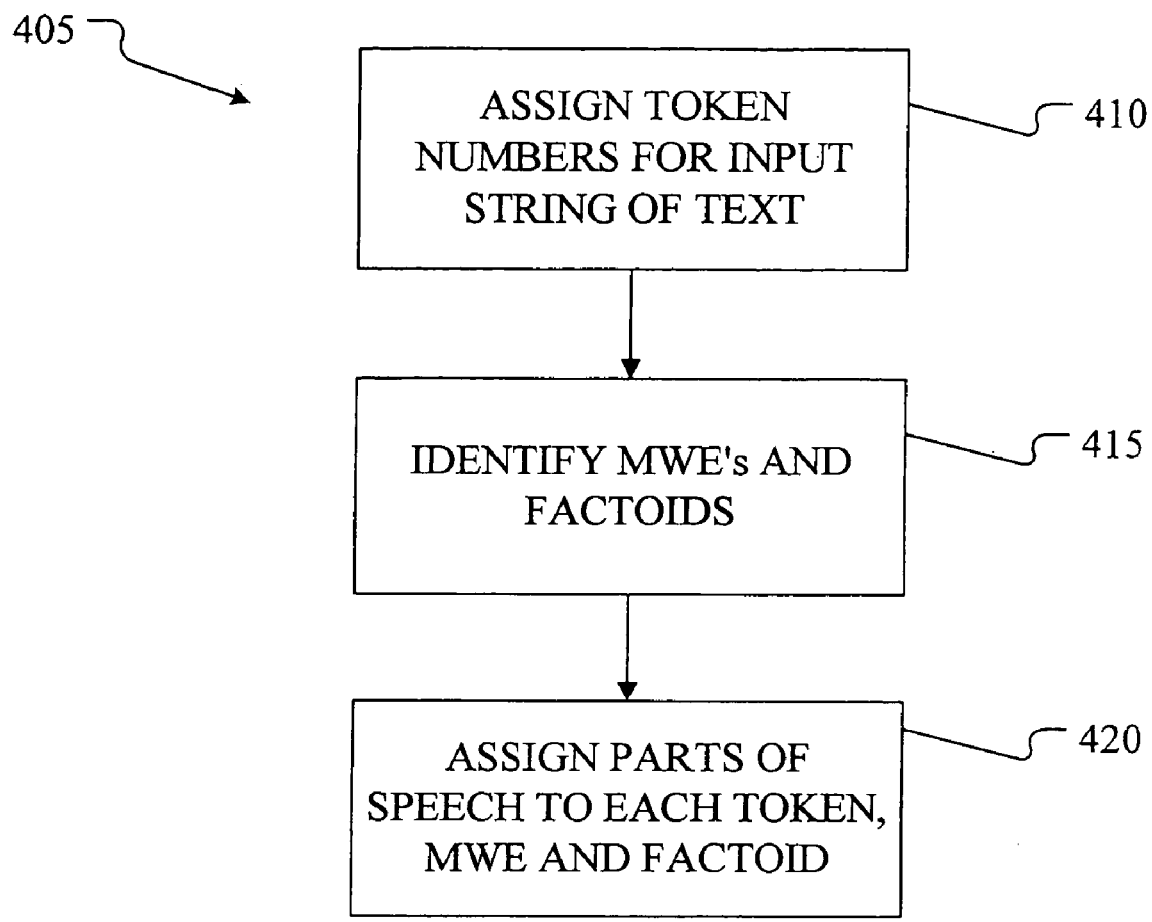

FIG. 4a is a flow diagram illustrating methods of the invention. As shown at block 405 in FIG. 4a, an input string of text is tokenized into tokens. FIG. 4b illustrates sub-steps that can be performed in order to implement tokenizing step 405 shown in FIG. 4a. FIGS. 5a–5e provide an illustrative example of some of the steps and sub-steps from FIGS. 4a and 4b.

Figures 5A, 5B, 5C, 5D, 5E:
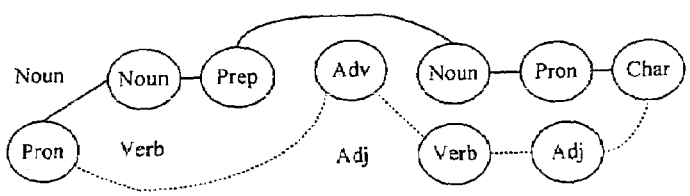
FIGS. 5a–5e are illustrations of various sub-steps in the tokenizing step shown in FIGS. 4a and 4b.

FIG. 5a illustrates an input string of text, "He sort of likes her." The corresponding tokens are shown in FIG. 5b. A token is generally a word but could also be a punctuation character such as a period. For purposes of explanation, tokens are numbered sequentially from the left starting with the number 0. There is a position at −1 that has no token, which exists to make explanation of the algorithm less complex. However, those skilled in the art will understand that the invention does not require the use of these additional tokens in all embodiments. As shown in FIG. 5b, the words (and punctuation) of the input sentence were sequentially assigned token numbers 1 through 6. Token numbers −1 and 0 are discussed below.

Referring back for the moment to FIG. 4b, the sub-step of assigning token numbers for the input string of text is shown at block 410. As shown at blocks 415 and 420, the step of tokenizing the input string of text also includes the sub-steps of identifying multi-word entries (MWE's) and Lactoids, and assigning parts of speech, respectively. In the example illustrated in FIGS. 5a–5e, the MWE "sort of" (FIG. 5c) is identified. The parts of speech are assigned for each token, as well as for MWEs and factoids corresponding to multiple tokens. For tokens identifying single words, each token is assigned one or more parts of speech either by looking up the word in a lexicon and/or by morphological processing. Through lexicon lookup, or other methods, multi-word entries are also identified and assigned one or more parts of speech. Through lexicon lookup, or by other methods such as context free grammars (CFGs) or augmented transition networks (ATNs) factoids are identified and assigned one or more parts of speech.

As shown in FIG. 5d, the word "He" (token number 1) is assigned the noun and pronoun parts of speech. The word "sort" (token number 2) is assigned the noun and verb parts of speech. The word "of" (token number 3) is assigned the preposition part of speech. The word "likes" (token number 4) is assigned the noun and verb parts of speech. The word "her" (token number 5) is assigned the pronoun and adjective parts of speech. The punctuation "." (token number 6) is assigned the character part of speech. Finally, the MWE "sort of" is assigned the adverb and adjective parts of speech.

A ParseLeafUnit (PLU) is defined as a word, MWE or factoid in a particular part of speech. Each PLU is also identified by its first token number (Ft) and its last token number (Lt). For PLUs that consist of a single token, then Ft is equal to Lt. For MWEs and factoids, Ft is less than Lt. The Ft,Lt token pairs for each PLU in the example sentence are shown in FIGS. 5b–5d, with FIG. 5d demonstrating the Ft,Lt token pair (2,3) for the MWE "sort of". Every PLU has a calculated probability, PosProb, which will correspond to the relative likelihood that the various parts of speech for a word will be the one used in the preferred parse for the input string.

Add Dummy Tokens and Construct PosColumnArray

Referring back to the flow diagram of FIG. 4a, the method next includes the step of adding "dummy" tokens for the input string. This is shown at block 425 in FIG. 4a. Dummy tokens are defined as tokens assigned to positions immediately prior to or after the first and last words, MWEs, factoids or characters of an input string. Two dummy tokens are added to the beginning of the tokens for the text string. The two dummy tokens are assigned a part of speech referred to in this example as the "BEGIN" part of speech. The first dummy token is assigned the token number −1, and the second dummy token is assigned the token number 0.

Two dummy tokens are also added to the end of the tokens for the text string. These two dummy tokens are assigned a part of speech referred to in this example as the "END" part of speech. These dummy tokens are given the token numbers n+1 and n+2, where n is the number of tokens in the sentence. In the example sentence shown in FIGS. 5a–5e, these two END dummy tokens would have token numbers 7 and 8.

Figures 6A, 6B:
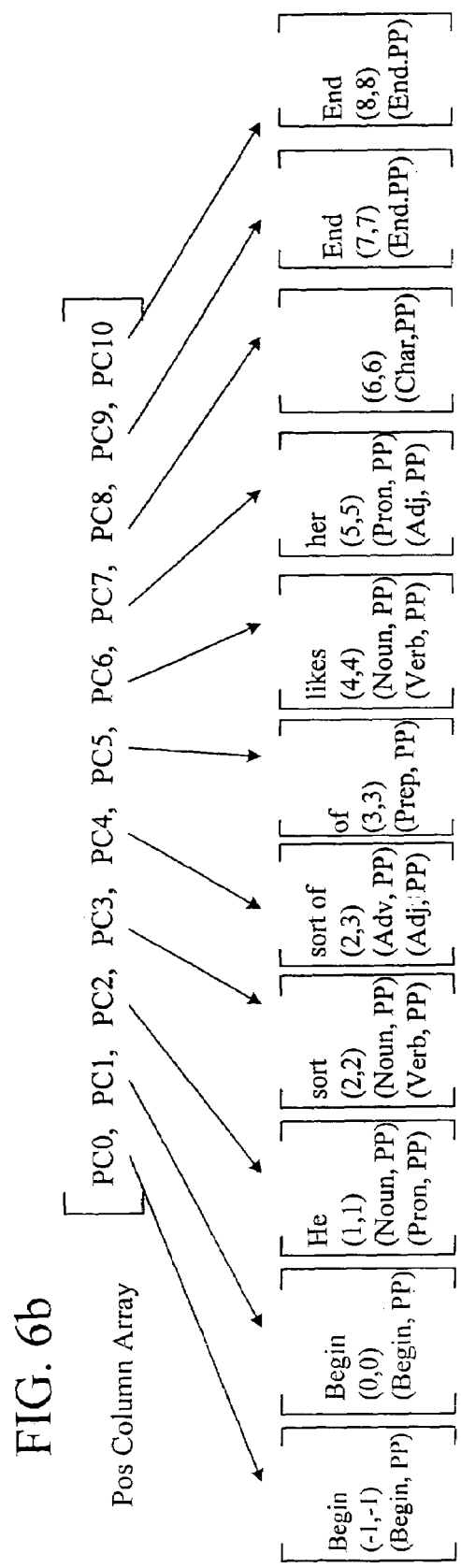
FIGS. 6a and 6b illustrate an example of a PosColumn and a PosColumnArray in accordance with the invention.
Figure 10:
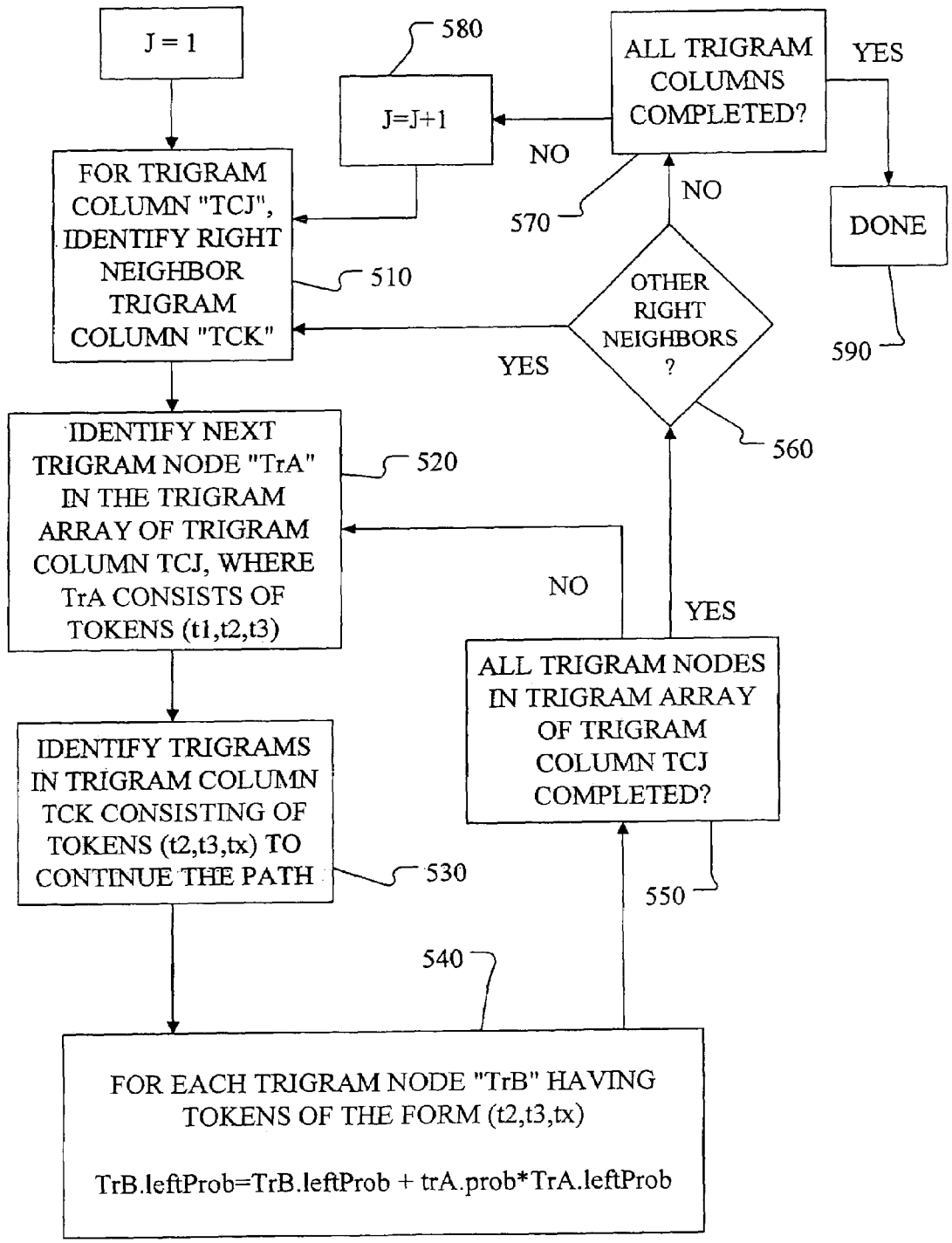
FIG. 10 is a flow diagram illustrating forward propagation computational steps in accordance with some embodiments of methods of the invention.

Next, a PosColumn is constructed for each Ft,Lt token pair. A PosColumn consists of all PLUs that have the same Ft,Lt. An example of a PosColumn is shown in FIG. 6a for the Ft,Lt pair corresponding to the word "He". In one embodiment, the PosColumn data for a particular Ft,Lt pair includes the Ft,Lt pair, the PLUs associated with the Ft,Lt pair (i.e., the word, MWE or factoid from the input string of text and its one or more assigned parts of speech), and the probability PosProb (PP) for each of the different parts of speech. In FIG. 6a, two PLUs are included in the PosColumn for the Ft,Lt pair (1,1). The first PLU corresponds to the noun part of speech assigned to the word "He", while the second PLU corresponds to the pronoun part of speech assigned to the same word.

Next, an array referred to herein as the PosColumnArray is formed. This is an array of all PosColumns for each Ft,Lt token pair in the string (including dummy tokens). In essence, the PosColumnArray is a 2D array of PLUs. FIG. 6b illustrates the PosColumnArray for the input string "He sort of likes her." Note that the PosColumnArray also includes PosColumns for Ft,Lt pairs corresponding to dummy tokens −1, 0, 7 and 8. Each PosColumn in the PosColumnArray can be identified by a unique identifier (PC0 through PC10 in the illustrated example)

Construct TrigramColumns

Referring back to the flow diagram of FIG. 4a, the method further includes the step illustrated at block 430 of constructing TrigramColumns. In constructing the TrigramColumns, it is useful to understand that a PosColumn having the token pair (Ft1, Lt1) is to the immediate right of another PosColumn having the token pair (Ft2, Lt2) if Ft1=Lt2+1. The PosColumn having the token pair (Ft1, Lt1) is to the immediate left of the PosColumn having the token pair (Ft2, Lt2) if Lt1+1=Ft2. A neighbor to a PosColumn is therefore all PosColumns on the left having an Lt value which is one less than the Ft value of the PosColumn, and all PosColumns on the right having an Ft value which is one greater than the Lt value of the PosColumn. Therefore, in FIG. 6b, PosColumns such as PosColumn PC2 will have multiple neighbors to the right (i.e., PC3 and PC4). Similarly, PosColumns such as PC6 will have multiple neighbors to the left (i.e., PC4 and PC5).

A TrigramColumn is a set of 3 PosColumns, for example PosColumns (PC1, PC2, PC3) from FIG. 6b, where PC1 is an immediate neighbor to the left of PC2, and PC2 is an immediate neighbor to the left of PC3. To enumerate all TrigramColumns, for each PosColumn in the PosColumnArray, determine all its immediate neighbors to its left and right. List all permutations of left neighbors and right neighbors. So if there were 3 neighbors to the left and 2 to the right of a particular PosColumn, there would be 6 total TrigramColumns having the particular PosColumn in the middle.

For TrigramColumn (PC1, PC2, PC3) where PC1 has x PLUs, PC2 has y PLUs and PC3 has z PLUs, we can form x*y*z trigrams. Every combination of tokens in PC1, PC2 and PC3 produces a trigram. FIG. 7 illustrates the PosColumn number set for each of the eleven TrigramColumns (designated TC1 through TC11) derived from the PosColumnArray shown in FIG. 6B.

Create Trigram Graph

Referring back to the flow diagram of FIG. 4a, after creation of the TrigramColumns, a Trigram Graph is created in the step shown at block 435. A Trigram Graph is shown in FIG. 8c. The Trigram Graph consists of TrigramColumns (represented in FIG. 8c by TrigramColumn numbers TC1–TC11) and an associated TrigramArray, which is an array of TrigramNodes. A Trigram node is shown in FIG. 8a, and a TrigramArray (TrigramArray(TC1)) is shown in FIG. 8b for TrigramColumn TC1.

The Trigram Graph is ordered left to right, in increasing order of the Ft or Lt of its first PosColumn. Each Trigram-Node represents a trigram that can be created from the three PosColumns in the corresponding TrigramColumn. From above: For TrigramColumn (PC1, PC2, PC3) where PC1 has x PLUs, PC2 has y PLUs and PC3 has z PLUs, there will be x*y*z TrigramNodes. A TrigramNode contains four probabilities:

a) the probability (Prob) of that particular trigram (found from the training corpus) and defined as P(POS3/POS1, POS2);
b) the probability (FP) of all forward paths till the point (calculated during the forward computation);
c) the probability (BP) of all backward paths till that point (calculated during backward computation); and
d) the sum (Path Prob) of probabilities of all paths through the node.

With reference to the probability (Prob) defined above, in a Trigram model, the probability of each token is conditioned on the two previous tokens. So, the probability of token T[n] following tokens T[n−1], and T[n−2] is P(T[n]/T[n−1], T[n−2]) which is calculated from the training corpus.

$$P(T[n]/T[n-1], T[n-2]) = \frac{\text{Count}(T[n-2], T[n-1], T[n])}{\text{Count}(T[n-2], T[n-1])}$$

Where,
Count(T[n−2],T[n−1],T[n]) is the number of times T[n−2], T[n−1], T[n] occurred in the training corpus); and Count (T[n−2],T[n−1]) is the number of times (T[n−2], T[n−1]) occurred in the corpus.

There is an ordering of the TrigramArray. For example, the $i^{th}$ PLU of PC1 (0≦i<x), the $j^{th}$ PLU of PC2 (0≦j<y) and the $k^{th}$ PLU of PC3 (0≦k<z) form the (i*(y*z)+j*z+k) element of the TrigramArray. Note that (i+j*x+k*(x*y)) is a also a valid ordering—in reverse. In other words, the TrigramArray is formed by enumerating the elements of the three PosColumns. This is in essence a 3D array. For each TrigramNode, Tr, initialize:

Tr.prob=trigram probability (found from the training corpus and is also referred to as "Prob" defined in paragraph (a) above and shown in FIG. 8a);
Tr.leftProb=1 if leftmost column, 0 otherwise (note, Tr.leftProb is also referred to as (FP) defined in paragraph (b) above and shown in FIG. 8a;
Tr.rightProb=1 if rightmost column, 0 otherwise (note, Tr.rightProb is also referred to as (BP) defined in paragraph (c) above and shown ih FIG. 8a.

Find Left and Right Neighbor TrigramColumns

Referring back to the flow diagram of FIG. 4a, the method further includes the step illustrated at block 440. In this step, for each TrigramColumn, all TrigramColumns to its left and all TrigramColumns to its right are found. The left and right neighboring TrigramColumns for each TrigramColumn shown in FIG. 7 are illustrated in FIG. 9. Generically, a TrigramColumn TCI(PCA, PCB, PCC) is said to be to the left of a second TrigramColumn TCJ(PCX, PCY, PCZ) if PCB=PCX and PCC=PCY. A TrigramColumn TCI(PCA, PCB, PCC) is said to the right of a TrigramColumn TCJ (PCX, PCY, PCZ) if PCY=PCA and PCZ=PCB.

Logic of the computation:
The trigram paths from the left and the right are independent. Therefore, to find the sum of all paths through a trigram node, one can find (a) the sum of all trigram paths from the left (in the forward computation); and (b) the sum of all trigram paths from the right (in the backward computation). Then, multiply the sums found in (a) and (b) with the probability of that trigram. This is actually used in the standard HMM training algorithm, and it is what makes this algorithm linear instead of exponential.

Forward Propagation Computation

Next, as shown at block 445 in FIG. 4a, the forward probability tr.leftprob is computed for each trigram node. This can be done using the following algorithm, which is also illustrated in the flow diagram of FIG. 10. Other algorithms can also be used.

For each TrigramColumn TCJ (i.e., 1≦J≦11 in the example) in the TrigramGraph from left to right (in increasing order of Ft or Lt of its first PosColumn), identify all neighbor TrigramColumns to the right. This is shown in block 510 of FIG. 10. For purposes of illustration, the right neighbor TrigramColumn for TCJ is referred to here as "TCK" (where K is another of TC1–TC11).

Next, as shown at block 520, TrigramNodes Tr in the TrigramArray of TrigramColumn TCJ are identified. Since steps which follow are performed for each of these Trigram-Nodes in the TrigramArray of TrigramColumn TCJ, a current or next of these TrigramNodes is referred to here as TrA for purposes of illustration of the following steps. TrigramNode TrA consists of tokens of the form (t1, t2, t3), where (t1, t2, t3 ) represent a set of three token numbers.

Next, as shown in the step illustrated at block 530, to continue the trigram path, trigrams consisting of a set of tokens (t2, t3, tx) are identified. Token "tx" represents a token number not found in TrigramNode TrA, while token numbers t2 and t3 represent tokens found in both Trigrm-Node TrA and in the trigrams identified as continuing the path.

Then, as illustrated at block 540, for each TrigramNode "TrB" having tokens of the form (t2, t3, tx), the forward propagation of the path probabilities is computed as follows:

$$TrB.\text{left}Prob=TrB.\text{left}Prob+TrA.prob*TrA.\text{left}Prob$$

Where,
TrB.leftProb=the Tr.leftProb for TrigramNode TrB;
TrA.prob=the trigram probability Tr.prob of TrigramNode TrA; and
TrA.leftProb=the Tr.leftProb for TrigramNode TrA.

These calculations are repeated for each TrigramNode "TrB" having tokens of the form (t2, t3, tx). Then, as shown at block 550, the process repeats for the next TrigramNode in the TrigramArray corresponding to TrigramColumn TCJ. As shown at block 560, the process is also carried out for all right neighbors of TrigramColumn TCJ. Blocks 570, 580 and 590 illustrate that the process is also repeated for each of the other TrigramColumns.

Backward Propagation Computation

As shown at block 450 in FIG. 4a, the backward probability tr.rightprob is computed for each trigram node. This can be done using the following algorithm, which is similar to the one used for forward probability computation. This algorithm is also illustrated in the flow diagram of FIG. 11. Other algorithms can also be used for backward probability computation.

For each TrigramColumn TCJ (i.e., 1≦J≦11 in the example) in the TrigramGraph from right to left (in decreasing order of Ft or Lt of its first PosColumn), identify all neighbor TrigramColumns to the left. This is shown in block

Figure 11:
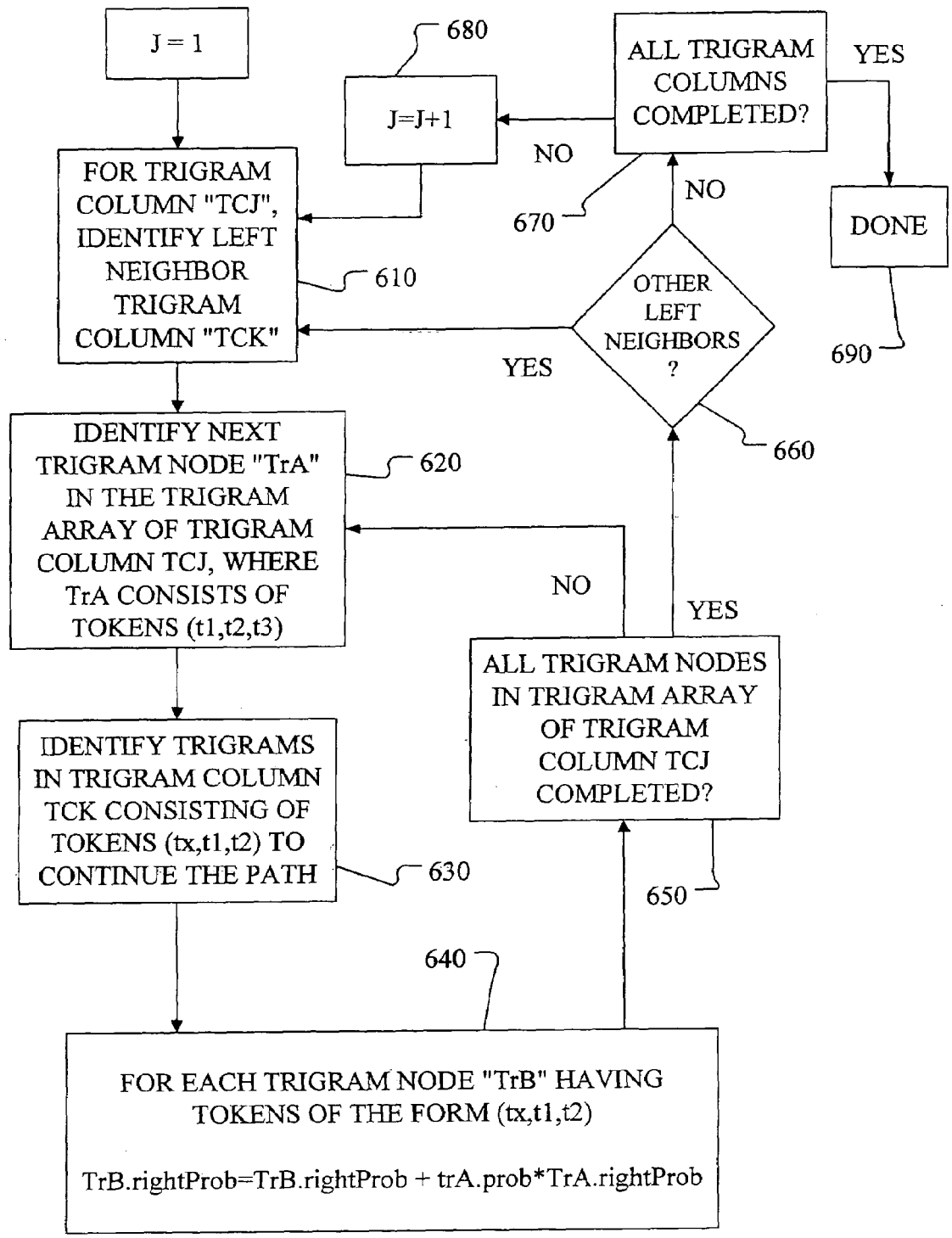
FIG. 11 is a flow diagram illustrating backward propagation computational steps in accordance with some embodiments of methods of the invention.

610 of FIG. 11. For purposes of illustration, the left neighbor TrigramColumn for TCJ is referred to here as "TCK" (where K is another of TC1–TC11).

Next, as shown at block 620, TrigramNodes Tr in the TrigramArray of TrigramColumn TCJ are identified. Since steps which follow are performed for each of these Trigram-Nodes in the TrigramArray of TrigramColumn TCJ, a current or next of these TrigramNodes is referred to here as TrA for purposes of illustration of the following steps. Trigram-Node TrA consists of tokens of the form (t1, t2, t3), where (t1, t2, t3) represent a set of three token numbers.

Next, as shown in the step illustrated at block 630, to continue the trigram path, trigrams consisting of a set of tokens (tx, t1, t2) are identified. Token "tx" represents a token number not found in TrigramNode TrA, while token numbers t2 and t3 represent tokens found in both Trigrm-Node TrA and in the trigrams identified as continuing the path.

Then, as illustrated at block 640, for each TrigramNode "TrB" having tokens of the form (tx, t1, t2), the forward propagation of the path probabilities is computed as follows:

$$TrB.rightProb=TrB.rightProb+TrA.prob*TrA.rightProb$$

Where,

TrB.rightProb=Tr.rightProb for TrigramNode TrB;

TrA.prob=the trigram probability Tr.prob of TrigramNode TrA; and

TrA.rightProb=Tr.rightProb for TrigramNode TrA.

These calculations are repeated for each TrigramNode "TrB" having tokens of the form (tx, t1, t2). Then, as shown at block 650, the process repeats for the next TrigramNode in the TrigramArray corresponding to TrigramColumn TCJ. As shown at block 660, the process is also carried out for all left neighbors of TrigramColumn TCJ. Blocks 670, 680 and 690 illustrate that the process is also carried out or repeated for each of the other TrigramColumns.

Write Results Back for Each PLU

Referring again to FIG. 4a, at block 455 it is shown that after the forward and backward propagation phases, for each trigram the sum of all trigram paths through that trigram can be calculated. At the end of the backward propagation phase described above, at each TrigramNode:

Tr.leftProb has the sum of all trigram paths that end at that trigram;

Tr.rightProb has the sum of all trigram paths that start at that trigram; and

Tr.prob is the probability of that trigram.

Figure 12:
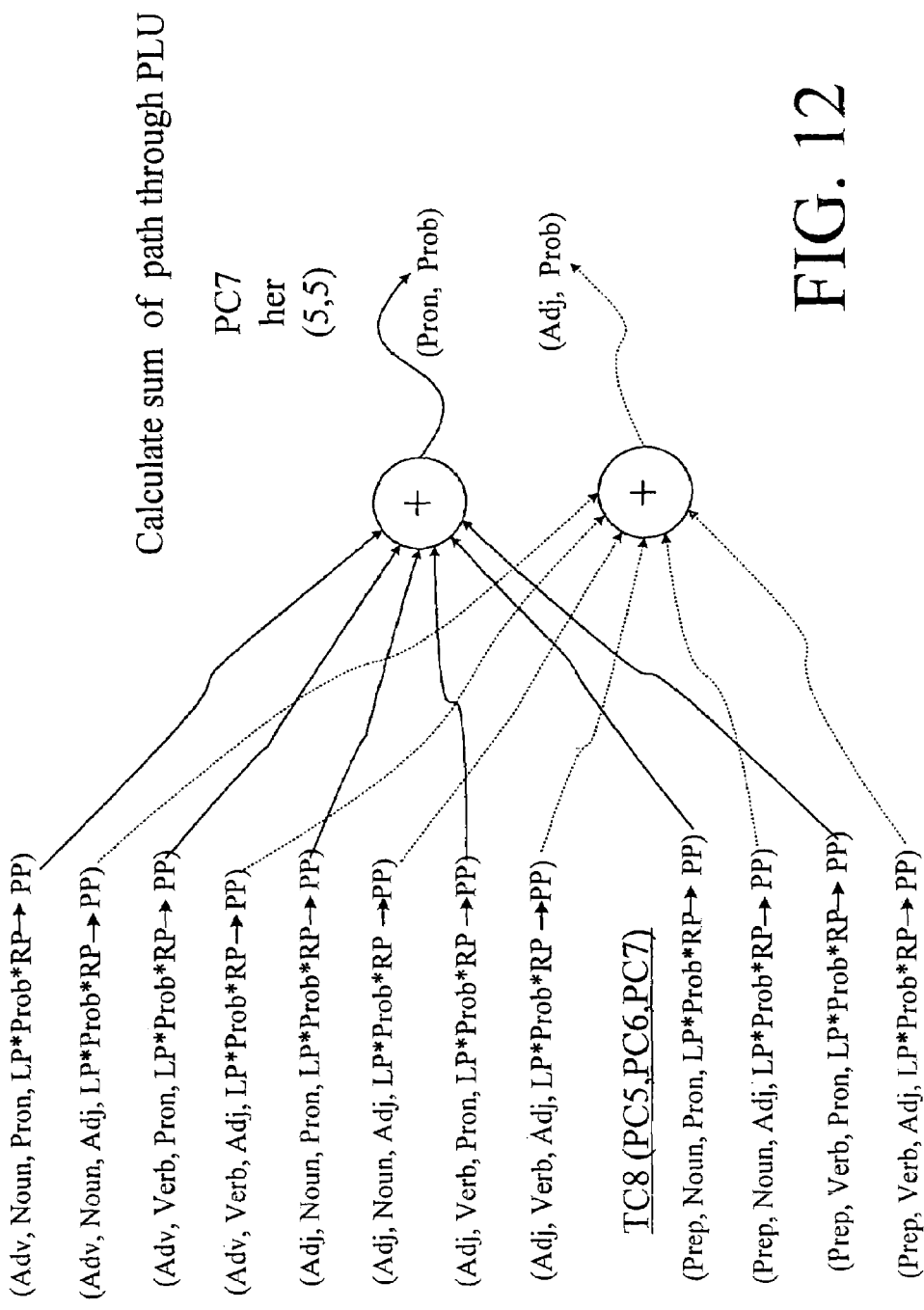
FIG. 12 is a diagrammatic illustration of the step of writing to each PLU the sum of all trigram paths through that PLU.

To get the sum of all trigram paths through that trigram, these three probabilities are multiplied together at every node. This can be seen, for example, in FIG. 12, which illustrates the eight nodes of TrigramColumn TC7 and the four nodes of TrigramColumn TC8 from the previously illustrated example. In FIG. 12, the path probability (PP) of each node is shown to be the result of multiplying Tr.leftProb (i.e., forward probability FP from FIG. 8a), Tr.rightProb (i.e., backward probability BP from FIG. 8a) and Tr.prob (i.e., Prob from FIG. 8a) of that node. This gives the sum of all paths through that trigram for every trigram.

Then, the sum of trigram paths through each PLU is calculated. This can also be seen diagrammatically in FIG. 12 where the sum of all PP's for all trigram paths through the pronoun PLU of PC7 and the sum of all PP's for all trigram paths through the adjective PLU of PC7 are calculated. Since, each trigram consists of three PLUs, the result can be written into one of them (e.g., the third token t3).

For each TrigramNode Tr (pos1, pos2, pos3):

$$Pos3.PosProb=pos3.PosProb+tr.prob*tr.leftProb*tr.rightProb)$$

Each pos represents a word/mwe/factoid in a particular part of speech. Therefore pos3.PosProb represents that probability. This probability is not absolute, it is only relative to other pos's, i.e. relative to the same word/mwe/factoid in different parts of speech.

Re-normalize the PosProbs in Each PosColumn

Figure 13:
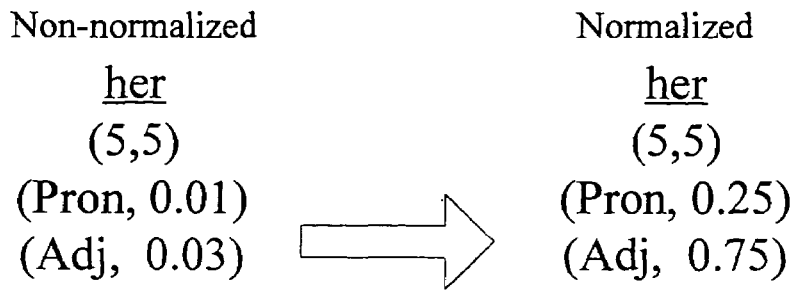

At this point, each PLU has the sum of the probabilities of all trigram paths that pass through that PLU stored in the PosProb parameter. Their scores give their relative probability assignments. At this point, the PosProbs for each PosColumn are normalized, as illustrated at block 465 of FIG. 4a. FIG. 13 illustrates the normalization for PosColumn PC7. Generally, the PosProbs for each PosColumn can be normalized to sum to one.

For each PosColumn, sum the PosProbs for each PLU, calling the sum SUM. Then for each PLU set:

$$PosProb=PosProb/SUM.$$

The relative probabilities of each PLU in a PosColumn are obtained using trigram estimation.

First Alternative PosProb Normalization Step

In order to re-normalize MWEs or factoids and their constituent PLUs, one could just use the technique described above. However, because larger units (MWEs and factoids) are in different PosColumns from their constituent PLUs, they are not necessarily normalized against each other. For instance, if each just had one part of speech, then the PosProb for both the larger unit and its constituents would be 1.0, and no differentiation would have been achieved. In order to differentiate, one must normalize each against the other. One alternative way to do this is to consider all PosColumns that contain a given token number and normalize them as a unit.

For each PosColumn that spans a given token number, sum the PosProbs for each PLU, calling the sum SUM. Then, for each PLU set:

$$PosProb=PosProb/SUM.$$

Figure 14:
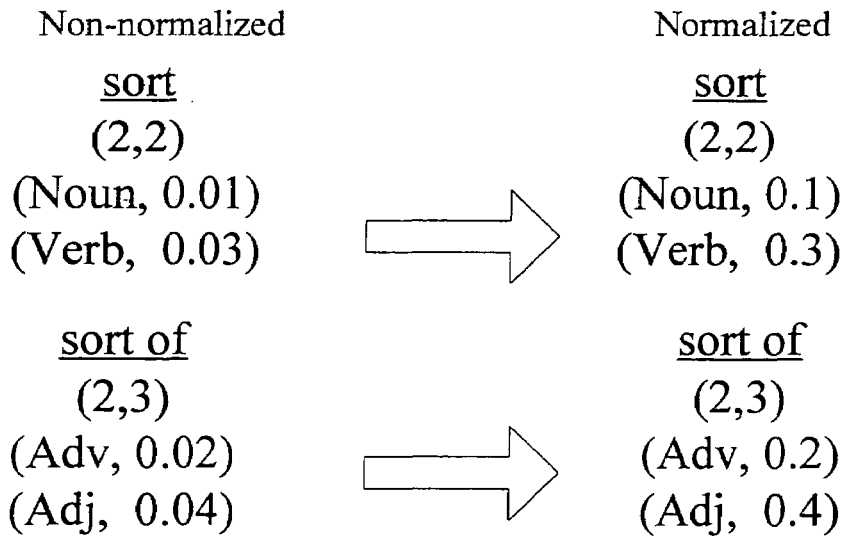

This is illustrated by way of example in FIG. 14. In the example sentence in the PosColumnArray shown in FIG. 6b, both PosColumn PC3 ("sort") and MWE PosColumn PC4 ("sort of") share the token number 2. In a hypothetical example illustrated in FIG. 14, the sum of the non-normalized PosProbs for these two PosColumns (i.e., 0.01, 0.03, 0.02 and 0.04) is equal to 0.1. Dividing each of these PosProbs by SUM (i.e., by 0.1) gives the normalized PosProbs shown in FIG. 14.

Second Alternative PosProb Normalization Step

One drawback with the first alternate step described above with reference to FIG. 14 is that there are less transitions (and therefore less multiplications by numbers less than zero) in trigram paths through a MWE or factoid constituent than there are through the MWE or factoid. This is because there is a transition from say, the first word of a MWE constituent to the second, while the MWE is treated as a unit. This tends to cause the larger unit to be favored. To account for this one can normalize the PosProbs in a TrigramColumn containing a constituent of a larger unit (MWE or factoid).

For example, as shown in FIG. 15 in which TrigramColumn TC4 is normalized, for any TrigramColumn that has constituents of a larger unit in its first two columns, set the trigram probability to 1. This will make sure that all trigram paths have the same number of trigram probabilities.

For example,

Let F be a mwe/factoid that includes X, Y and Z where X, Y and Z are individual tokens (i.e. F=XYZ). A, B are tokens that appear before X, and C, D appear after Z. Then, for paths in which X, Y and Z are independent tokens, the probability calculation will be:

(Prob calculation for all tokens before A)*P(A/B,X) *P(B/X, Y)*P(X/Y, Z)*P(Y/Z, C)*P(Z/C, D)* (Prob calculation after Y)

For paths through F, the calculation is:

(Prob calculation for all tokens before A)*P(A/B, XYZ)*P(B/XYZ, C)*P(XYZ/C, D)*(Prob calculation after Y)

Thus, paths through a larger entity will be favored. To normalize this, one could set probability of P(X/Y,Z) and P(Y/Z, C) to be 1. That way, every path would have the same number of probabilities.

Exemplary System

Referring back to FIG. 3, an overview of system 300 is provided in conjunction with the above description of the methods of the invention. The following discussion is for an exemplary system configured to implement the methods. However, other system configurations can be used.

Tokenizer 310 is configured to tokenize the input string of text to create parse leaf units (PLUs). In various embodiments, tokenizer 310 tokenizes the input string of text by assigning a token number, consecutively from left to right, to each word and character in the input string of text. The tokenizer (or another component) also identifies MWEs and factoids in the input string of text, and assigns parts of speech to each token, MWE and factoid.

PosColumn generator 320 is configured to construct a PosColumn for each word, MWE, factoid and character in the input string of text which has a unique first (Ft) and last (Lt) token pair associated therewith. This includes adding dummy tokens for positions immediately prior to the first word, MWE, factoid or character of the input string. It also includes adding dummy tokens for positions immediately after the last word, MWE, factoid or character of the input string. A "Begin" part of speech is assigned to dummy tokens for positions immediately prior to the first word, MWE, factoid or character of the input string. An "End" part of speech is assigned for positions immediately after the last word, MWE, factoid or character of the input string.

In constructing the PosColumn for each word, character and dummy token, the unique Ft and Lt token pair for that PosColumn has an Ft token number which is equal to the Lt token number. For each MWE and factoid, the Ft token number is less than the Lt token number. In addition to the unique Ft and Lt token pair, for each PLU in a particular PosColumn, the PosColumn further includes the corresponding assigned part of speech and a path probability for the PLU.

TrigramColumn generator 330 is configured to construct TrigramColumns corresponding to the input string of text. Each TrigramColumn defines a corresponding TrigramNode representing a trigram for three PosColumns in the TrigramColumn. Each TrigramNode is identifiable by a unique set of three tokens. TrigramColumn generator 330 is also configured to determine for each TrigramColumn all neighboring TrigramColumns to the immediate left and to the immediate right.

Trigram Graph generator 340 is configured to construct a Trigram Graph. The Trigram Graph includes with each of the constructed TrigramColumns an array of associated TrigramNodes. Each TrigramNode contains a probability of the corresponding trigram, the forward probability of all forward paths through the TrigramNode, the backward probability of all backward paths through the TrigramNode, and the sum of all trigram path probabilities of all paths through the TrigramNode.

Trigram path probability calculator 350 is configured to calculate the forward trigram path probability and the backward trigram path probability for each separate TrigramNode of each TrigramColumn. Calculator 350 also calculates the sums of all trigram path probabilities through each PLU as a function of the calculated forward and backward trigram path probabilities.

The trigram path probability calculator is further configured to calculate the forward trigram path probability for each separate TrigramNode of each TrigramColumn by calculating the forward trigram path probability, for each separate TrigramNode of each TrigramColumn, of all forward paths from a TrigramNode in a right neighboring TrigramColumn through the separate TrigramNode. The trigram path probability calculator is similarly configured to calculate the backward trigram path probability for each separate TrigramNode of each TrigramColumn by calculating the backward path probability, for each separate TrigramNode of each TrigramColumn, of all backward paths from a TrigramNode in a left neighboring TrigramColumn through the separate TrigramNode.

The trigram path probability calculator is further configured to calculate, for each TrigramNode, the sum of all trigram path probabilities of all paths through the TrigramNode by multiplying the probability of the corresponding trigram, the forward probability of all forward paths through the TrigramNode, and the backward probability of all backward paths through the TrigramNode. Calculator 350 calculates the sums of all trigram path probabilities through each PLU by adding the sums of all trigram path probabilities, from each TrigramNode, corresponding to a path through the PLU.

Normalizer 360 is configured to normalize, for each PLU, the sums of all trigram path probabilities for the particular PLU.

Although the present invention has been described with reference to particular embodiments, workers skilled in the art will recognize that changes may be made in form and detail without departing from the spirit and scope of the invention. For example, references to a string of text being stored or acted upon should be understood to include various representations, such as parse trees, of the string of text.

What is claimed is:

1. A method of calculating trigram path probabilities for an input string of text, the method comprising:

tokenizing the input string often to create a plurality of parse leaf units (PLUs);

constructing a PosColumn for each word, multi-word-entry (MWE), factoid and character in the input swing of text which has a unique first (Ft) and last (Lt) token pair associated therewith;

constructing all TrigramColumns corresponding to the input string of text, wherein each TrigramColumn defines a corresponding TrigramNode representing a trigram for three PosColumns in the TrigramColumn, each TrigramNode being identifiable by a unique set of three tokens;

determining, for each TrigramColumn, all neighboring TrigramColumns to the immediate left and to the immediate right;

calculating a forward trigram path probability, for each separate TrigramNode of each TrigramColumn, of all forward paths from a TrigramNode in a right neighboring TrigramColumn though the separate TrigramNode;

calculating a backward trigram path probability, for each separate TrigramNode of each TrigramColumn, of all backward paths from a TrigramNode in a left neighboring TrigramColumn though the separate TrigramNode; and calculating sums of all trigram path probabilities though each PLU as a function of the calculated forward and backward trigram path probabilities.

2. The method of claim 1, and further comprising normalizing, for each PLU, the sums of all trigram path probabilities for the particular PLU.

3. The method of claim 2 wherein normalizing, for each PLU, the stuns of all trigram path probabilities for the particular PLU further comprises normalizing the sums of all path probabilities through the particular PLU such that the sums for the particular PLU total one.

4. The method of claim 1, wherein tokenizing the input string of text further comprises assigning it token number, consecutively from left to right, to each word and character in the input string of text.

5. The method of claim 4, wherein tokenizing the input string of text further comprises identifying MWEs and factoids in the input string of text.

6. The method of claim 5, wherein tokenizing the input string of text further comprises assigning parts of speech to each token, MWE and factoid.

7. The method of claim 1, and after the step of constructing all TrigramColumns corresponding to the input string of text, further comprising creating a Trigram Graph, the Trigram Graph including with each of the constructed TrigramColumns an array of associated TrigramNodes.

8. A computer-readable medium having computer executable instructions for performing the trigram path probability calculating steps comprising:

tokenizing an input string of text to create a plurality of parse leaf units (PLUs);

constructing a PosColumn for each word, multi-word-entry (MWE), factoid and character in the input string of text which has a unique first (Ft) and last (Lt) token pair associated therewith;

constructing all TrigramColumns corresponding to the input string of text, wherein each TrigramColumn defines a corresponding TrigramNode representing a trigram for three PosColumns in the TrigramColumn, each TrigramNode being identifiable by a unique set of three tokens;

determining, for each TrigramColumn, all neighboring TrigramColumns to the immediate left and to the immediate right;

calculating a forward trigram path probability, for each separate TrigramNode of each TrigramColumn, of all forward paths from a TrigramNode in a right neighboring TrigramColumn through the separate TrigramNode;

calculating a backward trigram path probability, for each separate TrigramNode of each TrigramColumn, of all backward paths from a TrigramNode in a left neighboring TrigramColumn through the separate TrigramNode; and calculating sums of all trigram path probabilities through each PLU as a function of the calculated forward and backward trigram path probabilities.

9. The computer readable medium of claim 8, and further having computer executable instructions for performing the trigram path probability calculating step comprising normalizing, for each PLU, the sums of all trigram path probabilities for the particular PLU.

10. The computer readable medium of claim 8, wherein tokenizing the input string of text further comprises assigning a token number, consecutively from left to right, to each word and character in the input string of text.

11. The computer readable medium of claim 10, wherein tokenizing the input string of text further comprises identifying MWEs and factoids in the input string of text.

12. A trigram path probability calculating system for calculating trigram path probabilities for an input string of text, the system comprising:

a tokenizer configured to tokenize the input string of text to create a plurality of parse leaf units (PLUs);

a PosColumn generator configured to construct a PosColumn for each word, MWE, factoid and character in the input string of text which has a unique first (Ft) and last (Lt) token pair associated therewith;

a TrigramColumn generator configured to construct TrigramColumns corresponding to the input string of text, wherein each TrigramColumn defines a corresponding TrigramNode representing a trigram for three PosColumns in the TrigramColumn;

a trigram path probability calculator configured to calculate a forward trigram path probability and a backward trigram path probability for each separate TrigramNode of each TrigramColumn, the trigram path probability calculator further configured to calculate sums of all trigram path probabilities through each PLU as a function of the calculated forward and backward trigram path probabilities.

13. The trigram path probability calculating system of claim 12, wherein the TrigramColumn generator is configured to construct the TrigramColumns corresponding to the input string often such that each TrigramNode is identifiable by a unique set of three tokens, the TrigramColumn generator also configured to determine for each TrigramColumn all neighboring TrigramColumns to the immediate left and to the immediate right.

14. The trigram path probability calculating system of claim 13, wherein the trigram path probability calculator is configured to calculate the forward trigram path probability for each separate TrigramNode of each TrigramColumn by calculating the forward trigram path probability, for each separate TrigramNode of each TrigramColumn, of all forward paths from a TrigramNode in a right neighboring TrigramColumn through the separate TrigramNode.

15. The trigram path probability calculating system of claim 14, wherein the trigram path probability calculator is configured to calculate the backward trigram path probability for each separate TrigramNode of each TrigramColumn by calculating the backward path probability, for each separate TrigramNode of each TrigramColumn, of all backward paths from a TrigramNode in a left neighboring TrigramColumn through the separate TrigramNode.

16. The trigram path probability calculating system of claim 15, and further comprising a normalizer configured to normalize, for each PLU, the sums of all trigram path probabilities for the particular PLU.

17. The trigram path probability calculating system of claim 15, wherein the tokenizer is configured to tokenize the input string of text by assigning a token number, consecutively from left to right to each word and character in the input string of text.

18. The trigram path probability calculating system of claim 17, wherein the tokenizer is configured to tokenize the input string of text by further identifying MWEs and factoids in the input string of text.

19. The trigram path probability calculating system of claim 18, wherein the tokenizer is configured to tokenize the input string of text by further assigning parts of speech to each token, MWE and factoid.

20. The trigram path probability calculating system of claim 12, and further comprising a Trigram Graph generator configured to construct a Trigram Graph, the Trigram Graph including with each of the constructed TrigramColumns an array of associated TrigramNodes.

* * * * *